United States Patent
Chang

(10) Patent No.: US 9,229,612 B2
(45) Date of Patent: Jan. 5, 2016

(54) ELECTRONIC DEVICE, CONTROLLING METHOD FOR SCREEN, AND PROGRAM STORAGE MEDIUM THEREOF

(71) Applicant: Industrial Technology Research Institute, Hsinchu (TW)

(72) Inventor: Chia-Ming Chang, Hsinchu County (TW)

(73) Assignee: Industrial Technology Research Institute (TW)

( * ) Notice: Subject to any disclaimer, the term of this patent is extended or adjusted under 35 U.S.C. 154(b) by 178 days.

(21) Appl. No.: 14/011,518

(22) Filed: Aug. 27, 2013

(65) Prior Publication Data

US 2015/0067515 A1    Mar. 5, 2015

(51) Int. Cl.
| | | |
|---|---|---|
| G06F 3/16 | (2006.01) | |
| G06F 3/0481 | (2013.01) | |
| G06F 3/0484 | (2013.01) | |
| G06F 3/0488 | (2013.01) | |

(52) U.S. Cl.
CPC ............ *G06F 3/0481* (2013.01); *G06F 3/0488* (2013.01); *G06F 3/04845* (2013.01); *G06F 3/167* (2013.01)

(58) Field of Classification Search
CPC .................................................. G06F 3/0481
USPC .................................. 715/728, 481; 345/533
See application file for complete search history.

(56) References Cited

U.S. PATENT DOCUMENTS

| | | |
|---|---|---|
| 1,538,781 A | 1/1922 | Baehr |
| 1,663,517 A | 11/1925 | Ledwinka |
| 5,103,590 A | 4/1992 | Hanemaayer |
| 5,533,183 A | 7/1996 | Henderson et al. |
| 6,433,801 B1 | 8/2002 | Moon et al. |
| 6,532,152 B1 | 3/2003 | White et al. |
| 6,637,784 B1 | 10/2003 | Hauber et al. |
| 6,788,286 B2 | 9/2004 | Travers et al. |
| 7,145,554 B2 | 12/2006 | Bachmann |
| 7,411,582 B2 | 8/2008 | Toepke et al. |
| 7,887,530 B2 | 2/2011 | Zemlok et al. |
| 7,982,720 B2 | 7/2011 | Rosenberg et al. |
| 8,188,981 B2 | 5/2012 | Shahoian et al. |
| 8,239,784 B2 | 8/2012 | Hotelling et al. |
| 8,286,086 B2 | 10/2012 | Sampson et al. |

(Continued)

FOREIGN PATENT DOCUMENTS

| | | |
|---|---|---|
| CN | 1786892 | 6/2006 |
| CN | 101098533 | 1/2008 |

(Continued)

OTHER PUBLICATIONS

Yang, Xing-Dong et al., One-Handed Behind-the-Display Cursor Input on Mobile Devices . . . , CHI 2009, Apr. 4-9, 2009, pp. 6.

(Continued)

*Primary Examiner* — Amare Mengistu
*Assistant Examiner* — Joseph G Rodriguez

(57) ABSTRACT

An electronic device, a controlling method of a screen, and a program storage medium thereof are provided. The screen includes a display panel and a touch-sensitive panel. The display panel shows a root window on which all display contents are shown. The controlling method comprises the following steps. A command signal is received. The coordinate system of the screen is transformed with a transformation according to the command signal.

14 Claims, 5 Drawing Sheets

(56) References Cited

U.S. PATENT DOCUMENTS

| | | | |
|---|---|---|---|
| 8,289,292 | B2 | 10/2012 | Sip |
| 2004/0198485 | A1 | 10/2004 | Loose et al. |
| 2005/0015726 | A1* | 1/2005 | Tuominen .................... 715/733 |
| 2006/0007178 | A1 | 1/2006 | Davis |
| 2009/0049980 | A1 | 2/2009 | Sharma |
| 2009/0065039 | A1 | 3/2009 | Livacich et al. |
| 2009/0273567 | A1 | 11/2009 | Milley et al. |
| 2009/0273573 | A1 | 11/2009 | Hotelling |
| 2010/0064262 | A1 | 3/2010 | Liao |
| 2010/0245259 | A1 | 9/2010 | Bairagi et al. |
| 2010/0253620 | A1 | 10/2010 | Singhal |
| 2010/0315333 | A1 | 12/2010 | Hsu |
| 2011/0252307 | A1 | 10/2011 | Williamson et al. |
| 2011/0320974 | A1 | 12/2011 | Bai et al. |
| 2012/0066648 | A1 | 3/2012 | Rolleston et al. |
| 2012/0072820 | A1 | 3/2012 | Weinman, Jr. |
| 2012/0075223 | A1 | 3/2012 | Yamashita |
| 2013/0017525 | A1 | 1/2013 | Nguyen et al. |
| 2013/0212522 | A1* | 8/2013 | Fleizach ....................... 715/784 |

FOREIGN PATENT DOCUMENTS

| | | |
|---|---|---|
| CN | 101124532 | 2/2008 |
| CN | 201018547 | 2/2008 |
| CN | 101399856 | 4/2009 |
| CN | 101630219 | 1/2010 |
| CN | 201528370 | 7/2010 |
| CN | 101866257 | 10/2010 |
| CN | 102411428 | 4/2012 |
| CN | 202243130 | 5/2012 |
| CN | 102624198 | 8/2012 |
| CN | 102640102 | 8/2012 |
| CN | 102769344 | 11/2012 |
| CN | 102789355 | 11/2012 |
| CN | 102819345 | 12/2012 |
| CN | 102915201 | 2/2013 |
| EP | 1120302 | 8/2001 |
| EP | 0950234 | 5/2004 |
| GB | 455357 | 4/1935 |
| GB | 678237 | 8/1952 |
| GB | 1 295 535 | 11/1972 |
| JP | 4699955 | 6/2011 |
| KR | 1020080026231 | 3/2008 |
| TW | 200925951 | 6/2009 |
| TW | 1368866 | 7/2012 |
| TW | 1393045 | 4/2013 |
| WO | WO 94/19736 | 9/1994 |
| WO | WO 97/27674 | 7/1997 |
| WO | WO 2010/070192 | 6/2010 |
| WO | WO 2011/001237 | 1/2011 |

OTHER PUBLICATIONS

Karlson, Amy K. et al., One-Handed Touchscreen Input for Legacy Applications, CHI 2008 Proceedings, Mobile Interaction, Apr. 5-10, 2008, Florence, Italy, pp. 1399-1408.

Nakayama, Hironobu, Single camera 3D measuring for finger pointing in virtual space, Proc. of SPIE vol. 6395, 2006, pp. 8.

Zarek, Adam et al., SNOUT: One-Handed use of Capacitive Touch Devices, AVI '12, May 21-25, 2012, Copyright 2012 ACM, pp. 8.

Bezerianos, Anastasi et al., The Vacuum: Facilitating the Manipulation of Distant Objects, CHI 2005, Apr. 2-7, 2005, Copyright 2005 ACM, pp. 361-370.

Chan, Li-Wei et al., Touching the Void: Direct-Touch Interaction for Intangible Displays, CHI 2010, Apr. 10-15, 2010, Copyright 2010 ACM, pp. 2625-2634.

Sjoberg, Samuel, A Touch Screen Interface for Point-Of-Sale Applications in Retail Stores, pp. 58.

Denter, Christopher, Developing a Multi-Touch Application for Medical Volume Visualization, pp. 75.

neKo and neKo64 User's Guide, Copyright Open Labs, Inc., pp. 25.

Samsung Galaxy Note II User Manual, pp. 215, Copyright 2012 Samsung Telecommunications America (STA), LLC.

US 6,346,955, 02/2002, Moon et al. (withdrawn)

* cited by examiner

ELECTRONIC DEVICE, CONTROLLING METHOD FOR SCREEN, AND PROGRAM STORAGE MEDIUM THEREOF

TECHNICAL FIELD

The disclosure relates in general to an electronic device, a controlling method for a screen, and a program storage medium thereof.

BACKGROUND

Accompanying advancements in technologies, various electronic devices are constantly progressing. For example, some handheld devices equipped with a screen including a display panel and a touch-sensitive panel can be used for dialing a phone call, connecting to the internet, or playing games.

The user can use a finger to click the display content shown on the screen. Nowadays, mostly the size of the screen may be 3.5 inch, 4.2 inch or 7 inch. If the size of the screen is bigger, then the screen can show more. However, the user cannot hold the handheld device and click the display content by only one hand while the size of the screen is too big. It is inconvenient that the user must hold the handheld device by one hand and click the screen by the other hand.

SUMMARY

The disclosure is directed to an electronic device, a controlling method for a screen, and a program storage medium thereof.

According to one embodiment, a controlling method of a screen of an electronic device is provided. The screen includes a display panel and a touch-sensitive panel. The display panel shows a root window on which all display contents are shown. The controlling method comprises the following steps. A command signal is received. The coordinate system of the screen is then transformed with a transformation according to the command signal.

According to another embodiment, an electronic device comprises a screen and a processing unit. The screen includes a display panel and a touch-sensitive panel. The display panel shows a root window on which all display contents are shown. The processing unit is for transforming the coordinate system of the screen with a transformation according to a command signal.

According to another embodiment, a program storage medium storing a computer program is provided. The computer program is for causing an electronic device to perform the steps of: receiving a command signal; and transforming the coordinate system of a screen with a transformation according to the command signal.

Figure 1:
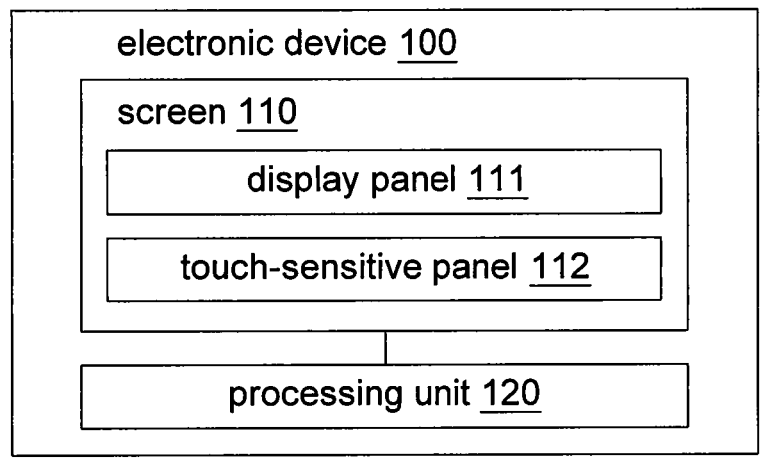
FIG. 1 shows an electronic device.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please referring to FIG. 1, an electronic device 100 is shown. The electronic device 100 includes a screen 110 and a processing unit 120. The screen 110 includes a display panel 111 and a touch-sensitive panel 112 from functional perspective. However, the display panel 111 and the touch-sensitive panel 112 may share the same physical space like those in in-cell touch technology, so it can be just one panel with displaying function and touch-sensing function at the same time. The display panel 111 is used for displaying pictures, icons or documents. For example, the display panel 111 may be a liquid crystal display (LCD) panel, an organic light-emitting diode (OLED) display panel, or an electronic paper display panel. The touch-sensitive panel 112 is used for receiving a touching gesture by a finger or a pen. For example, a user can swipe on the touch-sensitive panel 112 to switch to the next picture in a photo gallery application. A second example is to touch a display content such as an icon to execute the corresponding application program. The processing unit 120 is used for performing a controlling process, a calculating process or an analyzing process. For example, the processing unit 120 may be a processor, a chip, a firmware circuit, or a circuit board, etc.

In addition to touch-sensitive panel, some electronic components are also used to control an electronic device. For example, a physical button is usually used for a user to adjust the volume of the speaker, a microphone can be used to input a voice command to activate a menu item, and a motion sensor is used for a user to shake or tilt the electronic device to switch or move some display content.

Figure 2:
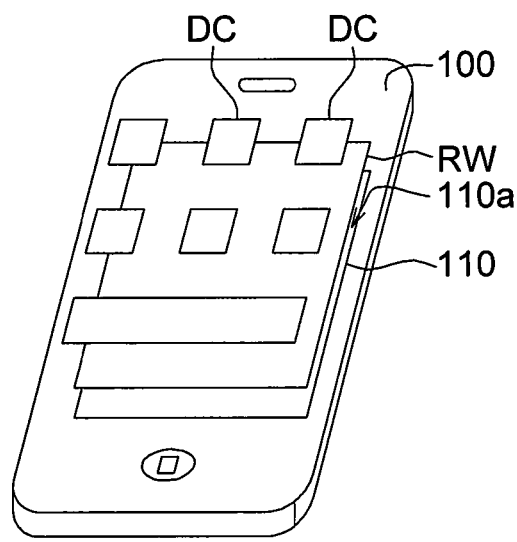
FIG. 2 shows the layers of a display area of a screen.

Please referring to FIG. 2, the layers of a display area 110$a$ of the screen 110 is shown. The display panel 111 of the screen 110 shows a root window RW. The root window RW is the bottom window for carrying all display content DC, such as option button, check box, push button, icons, pictures or documents. Normally, the root window RW fully occupies the display area 110$a$ of the screen 110. The display content DC is shown above the root window RW. The display content DC can be moved in the range of the root window RW.

Figure 3:
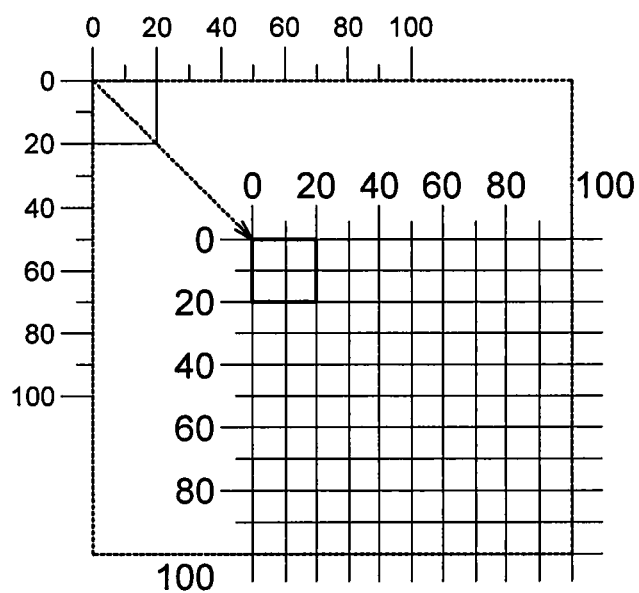
FIG. 3 shows a translation transformation of a rectangle.

In a 2-dimensional space, a point is usually denoted as $P_{x,y}$, where x is the coordinate value along the x-axis, and y is the coordinate value along the y-axis. A translation transformation, Translate (a, b), is a mathematical function that moves every point $P_{x,y}$ of an object in a 2-dimensional space to a new location $P_{x+a,y+b}$, where "+" is an addition operator. Please referring to FIG. 3, a translation transformation of a rectangle is shown.

Figure 4:
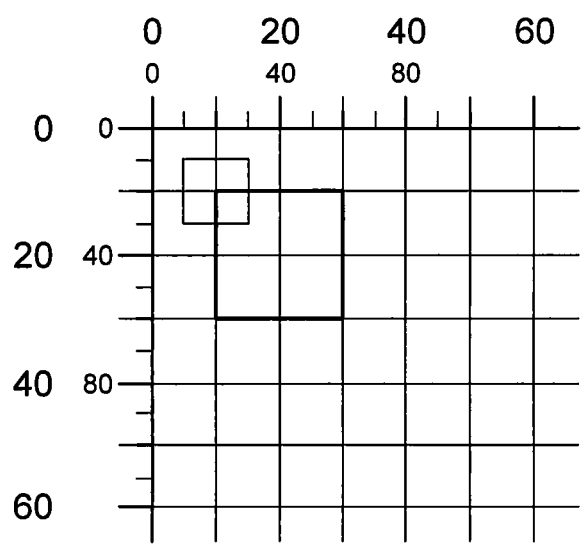
FIG. 4 shows a scaling transformation of a rectangle.

In addition, a scaling transformation, Scale (c, d), is a mathematical function that moves every point $P_{x,y}$ of an object in a 2-dimensional space to a new location $P_{x*c,y*d}$, where "*" is a multiplication operator. Please referring to FIG. 4, a scaling transformation of a rectangle is shown.

The size of the screen 110 may be 3.5 inch, 4.2 inch or 7 inch. If the size of the screen 110 is bigger, then the screen 110 can show more. However, the user cannot hold the electronic device 100 and click the display content DC by only one hand while the size of the screen 110 is too big. It is inconvenient that the user must hold the electronic device 100 by one hand and click the screen 110 by the other hand.

Figure 5:
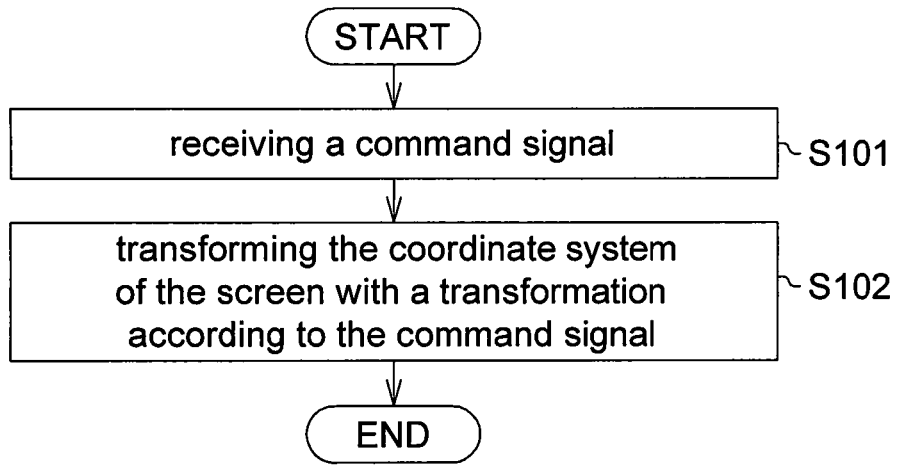
FIG. 5 shows a flow chart of a controlling method of the screen.
Figure 6:
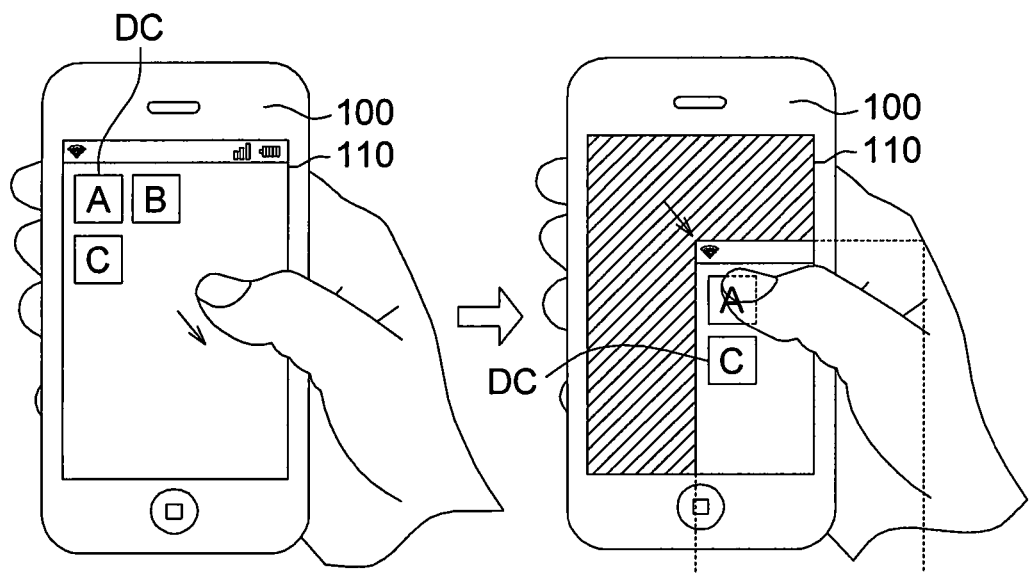
FIG. 6 shows an example of performing the controlling method.

In one embodiment, a controlling method of the screen 110 is provided for the user to hold and click the electronic device 100 by only one hand. Please referring to FIGS. 5 and 6, FIG. 5 shows a flow chart of the controlling method of the screen 110, and FIG. 6 shows an example of the operation scenario. The electronic device 100 of FIG. 1 is taken as an example for illustrating the controlling method of FIG. 5.

In step S101, a command signal is received. In one embodiment, the command signal is generated by touching and sliding on the touch-sensitive panel 112. For example, please referring to FIG. 6, the user uses his thumb to touch and slide on the screen 110 in a right-bottom direction.

In step S102, the processing unit 120 transforms the coordinate system of the screen 110 with a transformation according to the command signal. For example, please referring to FIG. 6, a translation transformation is applied to the coordinate system of the screen 110 so that the root window RW and all its carrying display content DC are shifted along the right bottom direction. In FIG. 6, the icon labeled "A" located at the left-top corner is then shifted along the right-bottom direction to a new location close to the center of the screen 110. As such, the user can then easily click the icon labeled "A" which is originally located at the left-top corner.

When the root window RW is shifted along the right-bottom direction, since the scale of the root window RW is not changed by the translation transformation, a left-top L-shaped area where the root window RW does not cover may not show anything and can be filled with a single black, white color, etc. Moreover, part of the root window RW and part of the display content DC are shifted to be outside of the screen 110 and are not displayed on the screen 110. That is to say, only part of the root window RW and only part of the display content DC are displayed on the screen 110.

Figure 7:
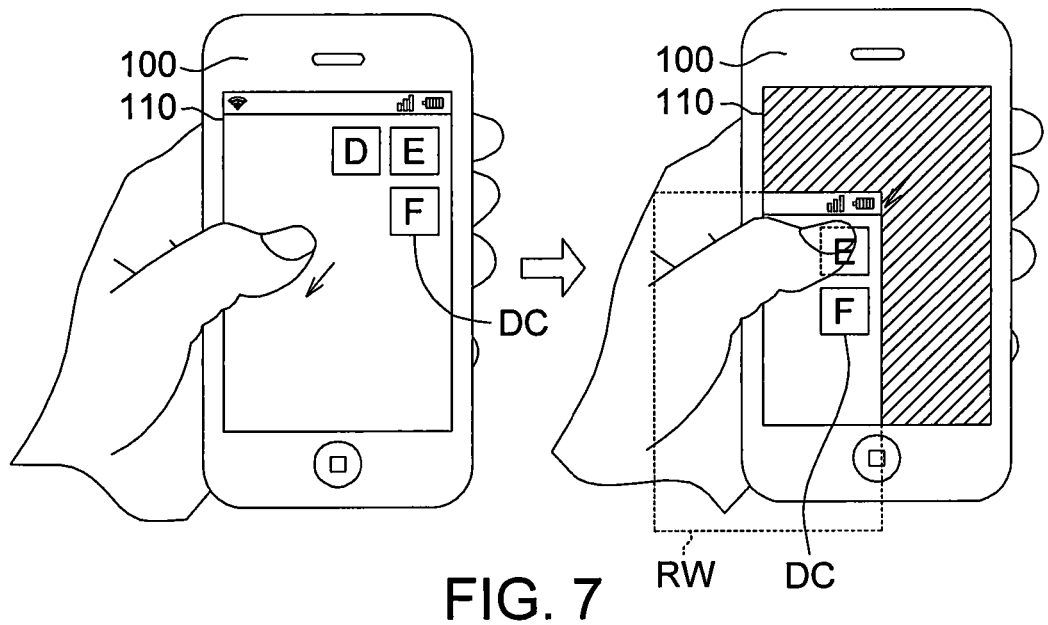
FIG. 7 shows another example of performing the controlling method.

Please referring to FIG. 7, FIG. 7 shows another example of the operation scenario. The user may use his thumb to touch and slide on the screen 110 in a left-bottom direction. In FIG. 7, the icon labeled "E" located at the right-top corner is then shifted along the left-bottom direction to a new location close to the center of the screen 110. As such, the user can then easily click the icon labeled "E" which is originally located at the right-top corner.

When the root window RW is shifted along the left-bottom direction, since the scale of the root window RW is not changed by the translation transformation, a right-top L-shaped area where the root window RW does not cover may not show anything and can be filled with a single black, white color, etc. Moreover, part of the root window RW and part of the display content DC are shifted to be outside of the screen 110 and are not displayed on the screen 110. That is to say, only part of the root window RW and only part of the display content DC are displayed on the screen 110.

Figure 8:
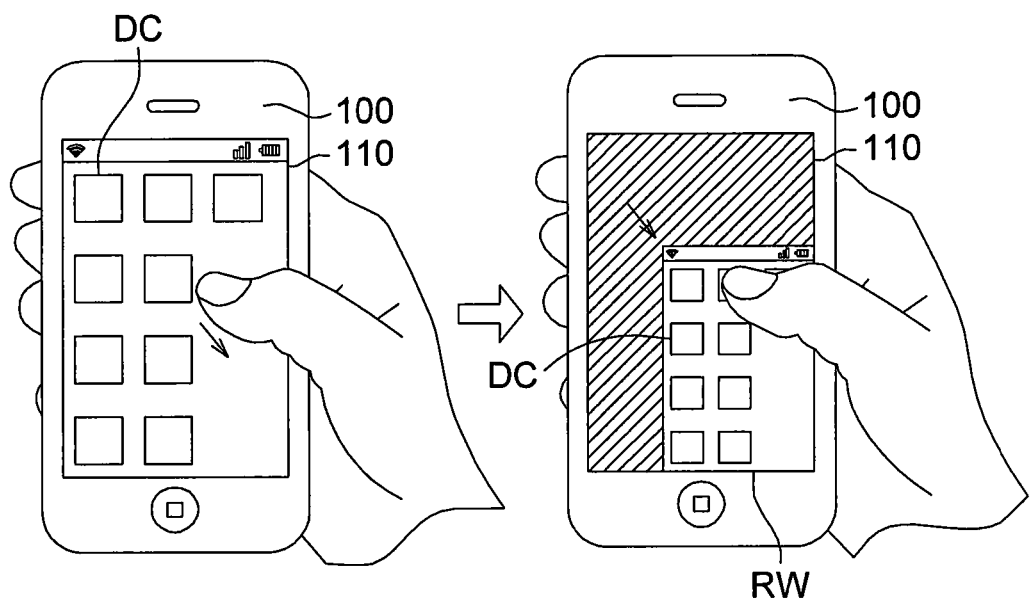
FIG. 8 shows another example of performing the controlling method.

Please referring to FIG. 8, FIG. 8 shows another example of the operation scenario. In this example, the root window RW is not only shifted but also shrunk because of a scaling transformation. The display content DC shown on the root window RW is shrunk as well. Let the origin of the coordinate system of the screen 110 be the left-top corner, then the right-bottom corner of the root window RW can be overlapped with the right-bottom corner of the display area 110a of the screen 110 when both a translation transformation and a scaling transformation are applied simultaneously.

That is to say, the root window RW does not shifted to be outside of the display area 110a. Therefore, whole of the root window RW which is shrunk is displayed on the screen 110, and all of the display content DC which is shrunk is displayed on the screen 110 as well. As such, the user can click all of the display content DC, even if the size of the screen 110 is big.

Figure 9:
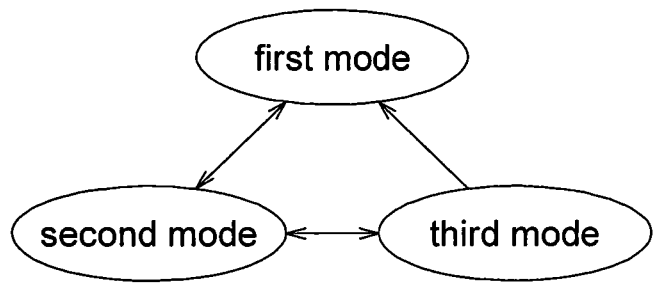
FIG. 9 shows that the screen is switched between three modes.

Note that the controlling method can be applied when the user needs to click a user interface object which is located far from the finger. It is a special application scenario for the electronic device 100. In one embodiment, as shown in FIG. 9, it shows that the screen 110 is switched between three modes. In the electronic device 100, the screen 110 has a first mode, a second mode and a third mode. During the first mode which is a normal mode, the coordinate system of the screen 110 is in the original place without any transformation, so the root window RW is fixed and fully occupies the display area 110a of the screen 110. The content touching function for controlling the display content DC is enabled in this mode.

During the second mode which is a transformable mode, the coordinate system of the screen 110 can be transformed by a touching and sliding on the touch-sensitive panel 112, so the content touching function is set to be disabled in this mode to avoid the ambiguity of the real action of the touching and sliding gesture can be.

During the third mode which is an operable mode, there may be some transformation applied to the coordinate system in the second mode before entering this mode, so the root window RW is fixed but may partially occupy the display area 110a of the screen 110. In this mode, the content touching function is enabled again to let a user control the electronic device 100.

Please referring to FIG. 9 again, in one embodiment, the screen 110 can be switched among the first mode, the second mode and the third mode. For example, the screen 110 can be switched from the first mode to the second mode if the electronic device 100 is shaken 2 times. The screen 110 can be switched from the second mode to the first mode if the electronic device 100 is shaken 2 times.

The screen 110 can be switched from the second mode to the third mode if the electronic device 100 is shaken 3 times. The screen 110 can be switched from the third mode to the second mode if the electronic device 100 is shaken 3 times.

The screen 110 can be switched from the third mode to the first mode if the electronic device 100 is shaken 4 times. However, the screen 110 cannot be switched from the first mode to the third mode directly. The shaken times described here are exemplary and explanatory only, but are not limited to. The number of the shaken times is a natural number.

Although the modes in FIG. 9 of the screen 110 is switched by shaking the electronic device in the above example, the switching can be activated by speaking a voice command, pressing a physical button, touching a display content (except in the second mode), etc.

Figure 10:
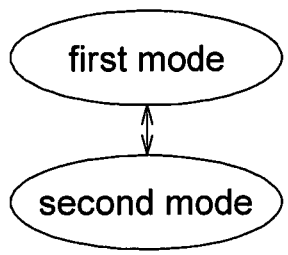
FIG. 10 shows that the screen is switched between two modes.

In FIG. 9, the screen 110 can be switched among 3 modes. In another embodiment, the second mode and the third mode can be combined together. Please referring to FIG. 10, FIG. 10 shows that the screen 110 is switched between two modes. The screen 110 has a first mode and a second mode. During the first mode which is the normal mode, the coordinate system of the screen 110 is in the original place without any transformation, so the root window RW is fixed and fully occupies the display area 110a of the screen 110. The content touching function for controlling the display content DC is enabled in this mode.

During the second mode which is the combination of the transformable mode and the operable mode, so the root window RW may be shifted by some transformation and partially occupies the display area 110a of the screen 110. However, the content touching function is enabled in this mode.

Please referring to FIG. 10, the screen 110 can be switched among the first mode and the second mode. For example, the screen 110 can be switched from the first mode to the second mode if the electronic device 100 is shaken 2 times. The screen 110 can be switched from the second mode to the first mode if the electronic device 100 is shaken 2 times. The shaken times described here are exemplary and explanatory only, but are not limited to. The number of the shaken times is a natural number.

Figure 11:
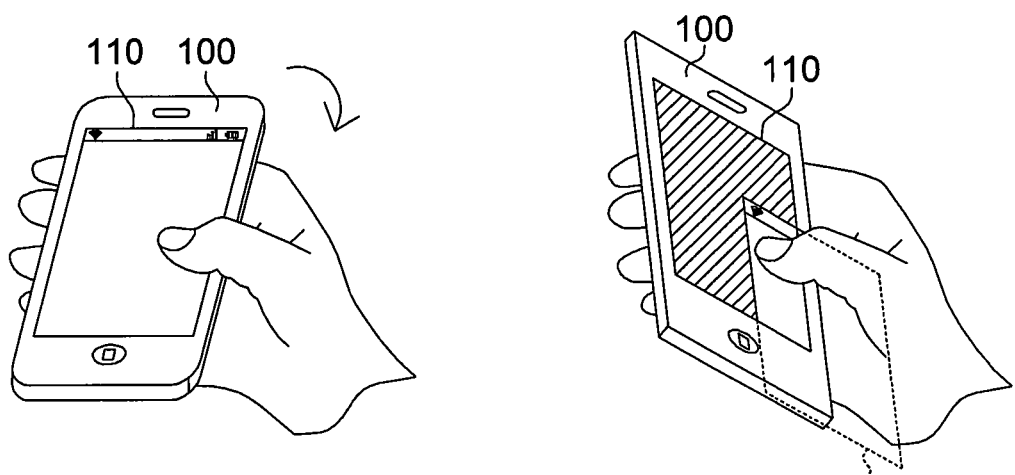
FIG. 11 shows another example of performing the controlling method.

Because the content touching function is enabled in both the first mode and the second mode, we cannot use touching and sliding gesture to generate the command signal that shall cause a coordination system transformation. Please refer to FIG. 11, FIG. 11 shows another example of performing the controlling method. In this example, when the screen 110 is in the second mode of FIG. 10, the command signal is generated by tilting the electronic device 100 without touching the screen 110. Therefore, the command signal for a coordination system transformation will not interfere with the clicking on the display content DC. And therefore, the transformable mode and the operable mode can be combined to be the second mode.

Although the modes in FIG. 10 of the screen 110 is switched by shaking the electronic device in the above example, the switching can be activated by speaking a voice command, pressing a physical button, touching a display content, etc.

In addition, in an embodiment, the processing unit further comprises at least one processor for performing relevant control procedures.

In another embodiment, the processing unit could be circuit design, be implemented on a chip. Specifically, any embodiment could be implemented by using a hardware description language (such as Verilog or VHDL) for circuit design, including circuit integration and layout. A circuit may be designed utilizing the hardware description language in numerous manners. For example, the manufacturer of integrated circuits may realize implementation with application-specific integrated circuits (ASIC) or customer-design integrated circuits.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A controlling method of a screen of an electronic device, wherein the screen includes a display panel and a touch-sensitive panel, the display panel shows a root window on which all display contents are shown, the controlling method comprising:
   receiving a command signal; and
   transforming a coordinate system of the screen with a transformation according to the command signal,
   wherein the screen has a first mode, a second mode and a third mode, the transformation is enabled during the second mode only, a content touching function for controlling the display content is enabled during the first mode and the third mode, the content touching function is disabled during the second mode, and the controlling method further comprises:
   switching the screen from the first mode to the second mode by speaking a first voice command, pressing a first physical button, touching a first display content, or shaking the electronic device N1 times;
   switching the screen from the second mode to the first mode by speaking a second voice command, pressing a second physical button, or shaking the electronic device N2 times;
   switching the screen from the second mode to the third mode by speaking a third voice command, pressing a third physical button, or shaking the electronic device N3 times;
   switching the screen from the third mode to the second mode by speaking a fourth voice command, pressing a fourth physical button, touching a second display content, or shaking the electronic device N4 times; and
   switching the screen from the third mode to the first mode by speaking a fifth voice command, pressing a fifth physical button, touching a third display content, or shaking the electronic device N5 times, where N1, N2, N3, N4, and N5 are natural numbers.

2. The controlling method according to claim 1, wherein the transformation comprises a translation.

3. The controlling method according to claim 2, wherein the transformation further comprises a scaling.

4. The controlling method according to claim 1, wherein the transformation comprises a scaling.

5. The controlling method according to claim 1, wherein in the step of receiving the command signal, the command signal is generated by touching and sliding on the touch-sensitive panel, tilting the electronic device, speaking a voice command, touching a display content, or pressing a physical button of the electronic device.

6. The controlling method according to claim 1, wherein the screen has a first mode and a second mode, the transformation is enabled during the second mode only, a content touching function for controlling the display content is enabled during the first mode and the second mode, and the controlling method further comprises:
   switching the screen from the first mode to the second mode by speaking a first voice command, pressing a first physical button, touching a first display content, or shaking the electronic device N1 times; and
   switching the screen from the second mode to the first mode by speaking a second voice command, pressing a second physical button, touching a second display content, or shaking the electronic device N2 times, where N1 and N2 are natural numbers.

7. An electronic device, comprising:
   a screen, including:
   a display panel, showing a root window on which all display contents are shown; and
   a touch-sensitive panel; and
   a processing unit, for receiving a command signal; and transforming a coordinate system of the screen with a transformation according to the command signal,
   wherein the screen has a first mode, a second mode and a third mode, the transformation is enabled during the second mode only, a content touching function for controlling the display content is enabled during the first mode and the third mode, the content touching function is disabled during the second mode, and
   wherein:
   the screen is switched from the first mode to the second mode by speaking a first voice command, pressing a first physical button, touching a first display content, or shaking the electronic device N1 times;

the screen is switched from the second mode to the first mode by speaking a second voice command, pressing a second physical button, or shaking the electronic device N2 times;

the screen is switched from the second mode to the third mode by speaking a third voice command, pressing a third physical button, or shaking the electronic device N3 times;

the screen is switched from the third mode to the second mode by speaking a fourth voice command, pressing a fourth physical button, touching a second display content, or shaking the electronic device N4 times; and the screen is switched from the third mode to the first mode by speaking a fifth voice command, pressing a fifth physical button, touching a third display content, or shaking the electronic device N5 times, where N1, N2, N3, N4, and N5 are natural numbers.

8. The electronic device according to claim 7, further comprises a motion sensor for detecting a tilting motion and then sending the command signal to the processing unit according to the tilting motion.

9. The electronic device according to claim 7, further comprises a microphone for receiving a voice command and then sending the command signal to the processing unit according to the voice command.

10. The electronic device according to claim 7, further comprises a physical button for detecting a pressing and then sending the command signal to the processing unit according to the pressing.

11. A program storage medium storing a computer program for causing an electronic device to perform a controlling method comprising the steps of:

receiving a command signal; and transforming a coordinate system of a screen with a transformation according to the command signal, wherein the screen has a first mode, a second mode and a third mode, the transformation is enabled during the second mode only, a content touching function for controlling a display content is enabled during the first mode and the third mode, the content touching function is disabled during the second mode, and the controlling method further comprises:

switching the screen from the first mode to the second mode by speaking a first voice command, pressing a first physical button, touching a first display content, or shaking the electronic device N1 times;

switching the screen from the second mode to the first mode by speaking a second voice command, pressing a second physical button, or shaking the electronic device N2 times;

switching the screen from the second mode to the third mode by speaking a third voice command, pressing a third physical button, or shaking the electronic device N3 times;

switching the screen from the third mode to the second mode by speaking a fourth voice command, pressing a fourth physical button, touching a second display content, or shaking the electronic device N4 times; and switching the screen from the third mode to the first mode by speaking a fifth voice command, pressing a fifth physical button, touching a third display content, or shaking the electronic device N5 times, where N1, N2, N3, N4, and N5 are natural numbers.

12. The program storage medium according to claim 11, wherein the transformation comprises a translation.

13. The program storage medium according to claim 12, wherein the transformation further comprises a scaling.

14. The program storage medium according to claim 11, wherein the transformation comprises a scaling.

* * * * *